United States Patent [19]
Doshi

[11] Patent Number: 6,024,396
[45] Date of Patent: Feb. 15, 2000

[54] CHARGE DISSIPATING BED AND LINER

[75] Inventor: Satish J. Doshi, Grand Blanc, Mich.

[73] Assignee: Durakon Industries, Inc., Lapeer, Mich.

[21] Appl. No.: 09/296,355

[22] Filed: Apr. 22, 1999

Related U.S. Application Data

[62] Division of application No. 09/127,365, Jul. 31, 1998, Pat. No. 5,899,519.

[51] Int. Cl.[7] .................................................... B60R 13/01
[52] U.S. Cl. ........................................ 296/39.2; 296/183
[58] Field of Search .................................... 296/39.2, 183

[56] References Cited

U.S. PATENT DOCUMENTS

| | | | |
|---|---|---|---|
| 5,370,436 | 12/1994 | Martindale | 296/39.2 |
| 5,505,512 | 4/1996 | Martindale | 296/39.2 |
| 5,544,932 | 8/1996 | Walworth et al. | 296/183 |
| 5,597,194 | 1/1997 | Daugherty et al. | 296/39.2 |
| 5,695,235 | 12/1997 | Martindale et al. | 296/39.2 |

Primary Examiner—Gary C. Hoge
Attorney, Agent, or Firm—Brinks Hofer Gilson & Lione

[57] ABSTRACT

A truck bed or liner for installation in a pickup truck bed or cargo vehicle exhibits improved electrical charge dissipating characteristics. The preferred embodiment bed is manufactured of high density polyethylene (HDPE) or similar material containing particles of conductive material such as carbon black dispersed therethrough. In a first alternate embodiment, the bed defines a two-layer composite or sandwich. The upper layer of HDPE or similar material includes dispersed carbon black particles whereas the lower layer is free of such particles. A second alternate embodiment of the invention comprehends a bed liner for disposition in a pickup truck or the like wherein the conductive material is dispersed throughout the liner material. In a third alternate embodiment, the bed liner of the second alternate embodiment is combined with the composite conductive and non-conductive layers of the first altermate embodiment. In a fourth alternate embodiment, a bed or liner of HDPE or similar material includes an open mesh fabric or webbing which has carbon black particles dispersed therein. The mesh or webbing is secured to the upper surface of a liner made of HDPE, preferably by autogenous bonding.

20 Claims, 3 Drawing Sheets

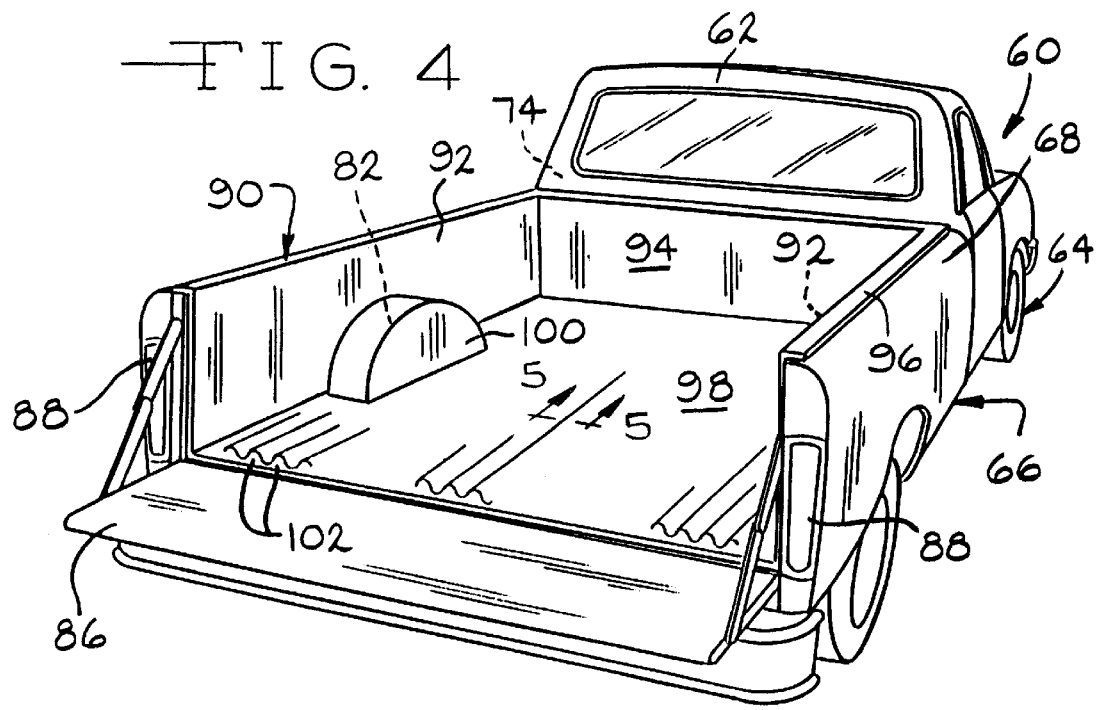
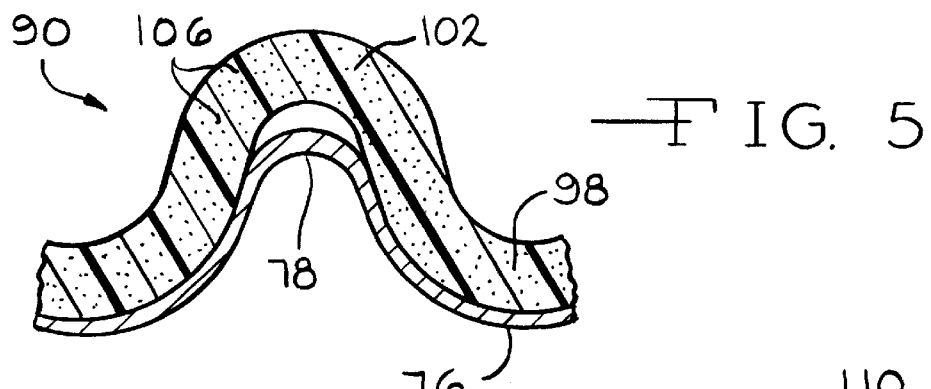
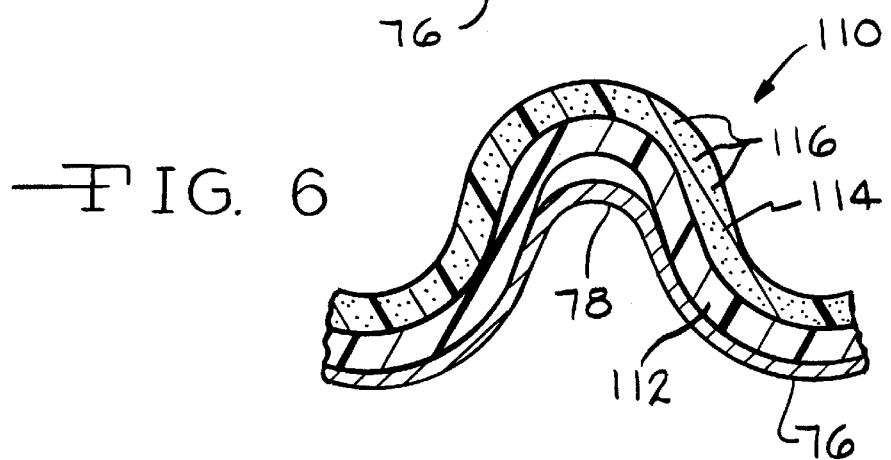

CHARGE DISSIPATING BED AND LINER

CROSS REFERENCE TO CO-PENDING APPLICATION

This application is a divisional application of Ser. No. 09/127,365, filed Jul. 31, 1998 now U.S. Pat. No. 5,899,519, granted May 4, 1999.

BACKGROUND OF THE INVENTION

The invention relates generally to beds and liners for pickup trucks, cargo vehicles and the like and more particularly to a bed or liner having improved electrical charge dissipating characteristics.

Liners for motor vehicles, particularly bed liners for pickup trucks and cargo vans provide many benefits. First of all, such bed liners provide a resilient barrier between the cargo area and the actual truck bed which absorbs energy and reduces denting and damage to the bed when heavy loads are transported. Second of all, such liners protect the vehicle bed or interior from water, salt and other possibly more corrosive materials which may be carried in the vehicle.

The emphasis on passenger car weight reduction has created a similar emphasis on behalf of manufacturers of light and medium duty trucks. One of the areas that has become a focus of such weight reduction is the vehicle box or bed. Replacing the metal box or bed with a non-metal, e.g., thermoplastic material, bed provides obvious and relatively significant weight reduction and other advantages. Resistance to rusting or corrosion and denting are but two of the accompanying advantages.

A drawback that accompanies relatively large components made from thermoplastic or other organic materials is their ability to become electrically charged and their inability to quickly dissipate such charges. This electrical activity is viewed as undesirable and products which do not exhibit this activity would therefore be desirable. The present invention is directed to such a product.

SUMMARY OF THE INVENTION

A truck bed or liner for installation in a pickup truck bed or cargo vehicle exhibits improved electrical charge dissipating characteristics. The preferred embodiment truck bed is manufactured of high density polyethylene (HDPE) or similar engineered thermoplastic material containing particles of carbon black or other conductive material dispersed therethrough. In a first alternate embodiment, the bed defines a two layer sandwich. The upper layer of HDPE or similar material includes dispersed carbon black particles or other conductive material whereas the lower layer is free of such particles. In a second alternate embodiment, a truck bed liner of HDPE or similar material includes dispersed carbon black or other conductive material.

A third alternate embodiment comprehends a truck bed liner defining a two layer sandwich with carbon black or similar conductive material in the upper layer. A fourth alternate embodiment bed or bed liner includes an open mesh fabric or webbing which has carbon black or other conductive material dispersed therein. The mesh or webbing is secured to the upper surface of a liner made of HDPE, preferably by autogenous bonding. Beds and liners according to the present invention provide improved dissipation of static electricity charges and thus improve safety with regard to possible static discharges.

Thus it is an object of the present invention to provide a truck bed fabricated of thermoplastic material containing dispersed particles of conductive material.

It is a further object of the present invention to provide a high density polyethylene (HDPE) truck bed having dispersed conductive particles which provides enhanced electrical charge dissipating characteristics.

It is a further object of the present invention to provide a liner for a pickup truck or cargo vehicle fabricated of HDPE containing dispersed particles of conductive material.

It is a still further object of the present invention top provide a liner for a pickup truck or cargo vehicle fabricated of HDPE which provides enhanced electrical charge dissipating characteristics.

It is a still further object of the present invention to provide a truck bed or liner comprising two layers of HDPE or similar material, one of which includes dispersed particles of conductive material.

It is a still further object of the present invention to provide a truck bed or liner of HDPE or similar material having a conductive fabric or webbing bonded to the upper surface of the bed or liner.

Further objects and advantage of the present invention will become apparent by reference to the following description of the preferred and alternate embodiments and appended drawings wherein like references numbers refer to the same component, element or feature.

BRIEF DESCRIPTION OF THE DRAWINGS

FIG. 4 is a perspective view of a pickup truck and conventional metal box or bed having a non-metallic bed liner according to the second alternate embodiment of the present invention;

FIG. 5 is a greatly enlarged, fragmentary, sectional view of a bed liner according to the second alternate embodiment of the invention taken along line 5—5 of FIG. 4;

FIG. 6 is a greatly enlarged, fragmentary, sectional view of a bed liner according to a third alternate embodiment of the present invention taken along line 5—5 of FIG. 4;

DESCRIPTION OF THE PREFERRED AND ALTERNATE EMBODIMENTS

Figure 1:
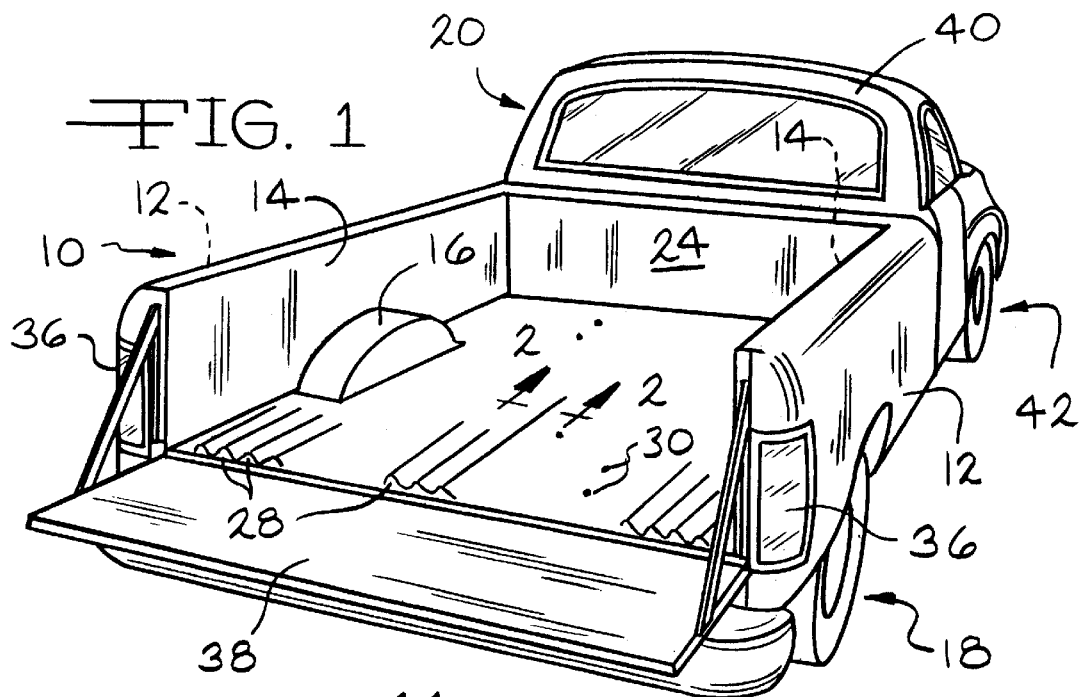
FIG. 1 is a perspective view of a pickup truck having a non-metallic box or bed incorporating the present invention.
Figure 2:
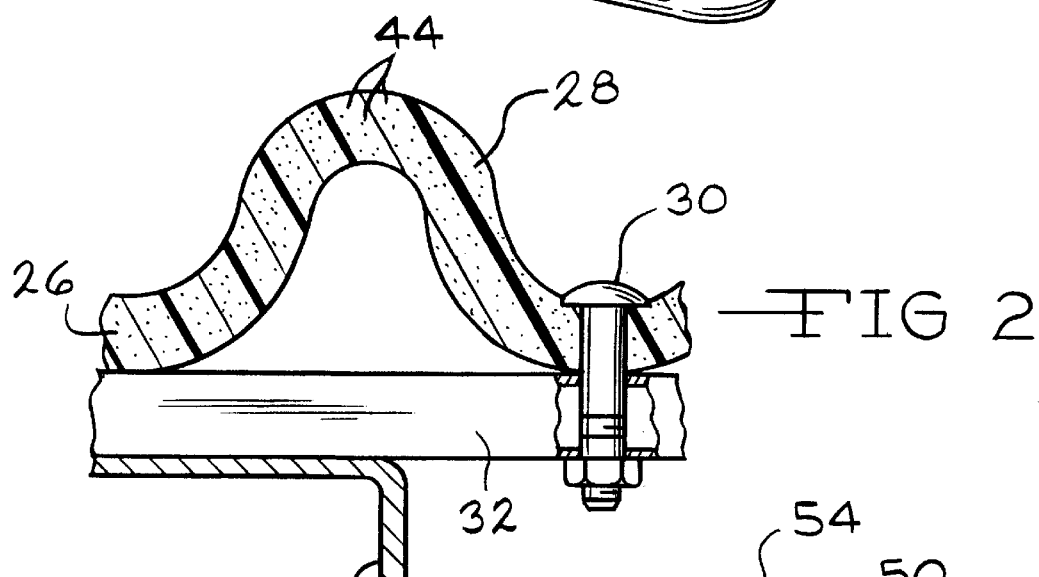
FIG. 2 is a greatly enlarged, fragmentary, sectional view of a truck bed according to the present invention taken along line 2—2 of FIG. 1.

Referring now to FIGS. 1 and 2, a non-metallic pickup truck bed incorporating the present invention is illustrated and designated by the reference number 10.

The non-metallic bed 10 is a unitary structure preferably molded of an engineered thermoplastic such as high density polyethylene (HDPE) or similar material. The bed 10 includes outer sidewalls 12 which merge smoothly with opposed generally parallel inner sidewalls 14. The inner sidewalls 14 are interrupted by wheel wells 16 which are suitably sized and located to receive the respective rear tire and wheel assemblies 18 of a pickup truck or similar light to medium duty cargo vehicle 20. The opposed inner sidewalls 14 merge with a transversely extending front wall 24 which may define a single panel interconnecting and merging with the inner opposed sidewalls 14 or a double wall panel having inner and outer panels which interconnect and merge with respective ones of the inner sidewalls 14 and the outer sidewalls 12. The pair of inner sidewalls 14 and the transverse front wall 24 all merge with and are interconnected by a bottom panel 26. To improve the strength and rigidity of the bottom panel 26, it preferably defines a plurality of corrugations 28 which extend longitudinally substantially its full length. A plurality of fasteners such as carriage bolts 30 or similar devices extend through the bottom panel 26 and secure the bed 10 to transverse braces or members 32 which are, in turn, secured to a frame or undercarriage 34 of the pickup truck 20. Preferably and typically, the non-metallic bed 10 includes backup and tail light assemblies 36 which function-in accordance with a conventional practice. A tailgate assembly 38 is pivotally disposed across the open end of the pickup truck bed 10. The pickup truck or vehicle 20 also includes a conventional cab 40 and front tire and wheel assemblies 42.

Figure 3:
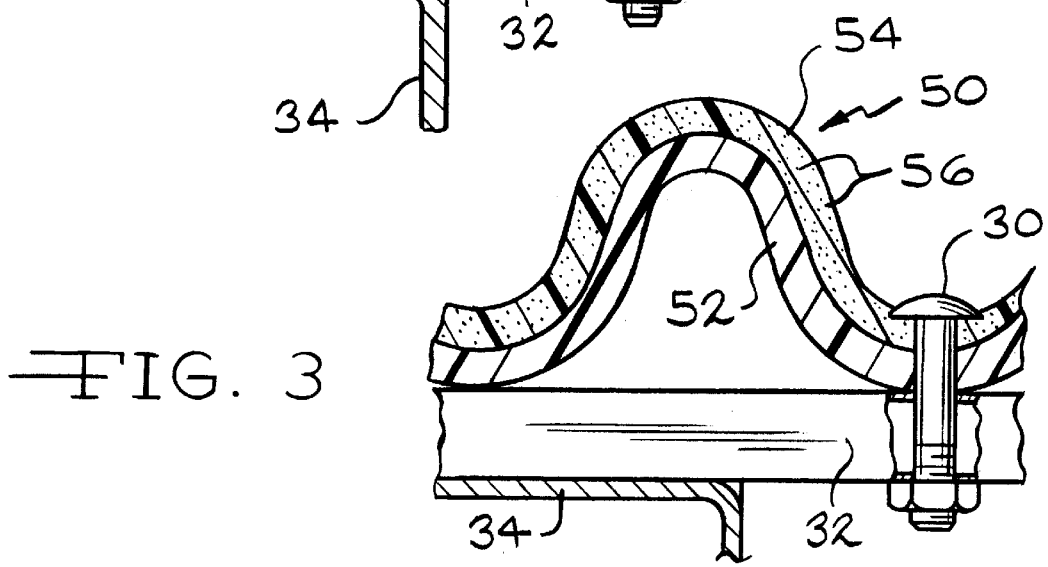
FIG. 3 is a greatly enlarged, fragmentary, sectional view of a truck bed according to a first alternate embodiment of the present invention taken along line 2—2 of FIG. 1.

Referring now to FIGS. 2 and 3, the non-metallic bed 10 and particularly a portion of the plurality of corrugations 28 of the bottom panel 26 are illustrated in cross section. In FIG. 2, the bottom panel 26 which, as noted, is preferably fabricated of high density polyethylene (HDPE) or similar engineered thermoplastic material which has been extruded into a sheet and then formed to the desired size and configuration includes dispersed conductive particles 44 of carbon black or similar material which are shown greatly enlarged for purposes of illustration. If carbon black, the conductive particles 44 may be like or similar to a product designated XC-72 manufactured by the Cabot Corporation or the product designated Ketjenblack EC-300 J manufactured by Akzo Nobel Chemicals, Inc. Other conductive materials such as carbon fibers or conductive metal particulate materials such as aluminum or copper powders or flakes are also suitable.

Preferably, the conductive particles 44 of carbon black represent approximately 18% to 22% of the total weight of material. Depending upon the choice of conductive material and substrate, however, conductive particles 44 in the range of 5% to 25% by weight may be utilized. When a coarser carbon black such as Cabot's XC-72 is used 18% to 22% carbon black by weight has produced good performance. Finer carbon black such as Akzo Nobel's Ketjenblack EC-300 J provide similar performance when utilized at about 8% to 12% by weight. The resulting product does and should exhibit surface resistivity of no more than $1 \times 10^9$ ohms and preferably less or volume resistivity of no more than $1 \times 10^9$ ohm-centimeters and preferably less.

It should be understood that higher weight percentages of conductive material lower both the surface and volume resistivities and vice versa. However, mixtures having conductive material above the weight percentages stated and resistivities significantly below those stated do not appear to confer any apparent performance benefits.

In FIG. 3, a first alternate embodiment vehicle bed 50 is illustrated. The overall structure of the vehicle bed 50 is the same as the preferred embodiment bed and includes the outer and inner sidewalls 12 and 14, the front wall 24 and the bottom panel 26. The first alternate embodiment vehicle bed 50 comprises, however, a composite or sandwich having a first, lower layer 52 of conventional HDPE or similar engineered thermoplastic material and a second or upper layer 54 of HDPE or other material similar to the first layer 52 except that it is doped with dispersed conductive particles 56 such as carbon black to the weight percents and electrical resistivity discussed directly above.

The first alternate vehicle bed 50 is preferably co-extruded from a suitable extruding machine (not illustrated) and then formed as necessary into the vehicle bed 10 illustrated in FIG. 1. It will be appreciated that the first alternate embodiment truck bed 50 exhibits substantially the same electrical charge dissipating characteristics as the preferred embodiment truck bed 10. However, because it is composed of a sandwich of materials to which conductive particles 56 are added only to the upper or second layer 54, it utilizes a smaller amount of conductive material per vehicle bed 50. Additionally, since the first layer 52 does not contain additives, its strength can be optimized.

While the electrical and charge dissipating activity of the truck beds 10 and 50 according to the present invention is not fully understood, it is believed that the conductive particles 44 of carbon black or other material form a conductive matrix of continuous conductive paths throughout the vehicle beds 10 and 50 and thereby disperse what would otherwise be isolated areas of electrical charge in a bed or bed liner. Through such dispersal, electric charges dissipate into the atmosphere over all or a significant portion of the surface area of the beds 10 and 50 and thus are harmlessly drained off. While conductive particles 44 of carbon black have been found the most suitable additive or doping agent from the standpoint of weight, color and expense, other materials such as carbon fibers or conductive metals such as aluminum, copper powder or flakes, as noted above, or other conductive particulate materials achieve this same function and goal. Thus these materials as well as other analogously functioning conductive materials and metals are deemed to be within the scope of this invention.

Referring now to FIGS. 4 and 5, a second alternate embodiment of the invention is illustrated. The present invention may also be utilized in a bed liner. A conventional pickup truck 60 includes a cab 62 and front tire and wheel assemblies 64. The conventional pickup truck 60 illustrated includes a conventional metal box or bed 66 having formed steel sidewalls 68. The sidewalls 68 merge with a transversely extending front wall 74 and both the sidewalls 68 and the front walls 74 merge with a bottom panel 76 which defines the cargo receiving area of the pickup truck 60. Typically the bottom panel 76 includes longitudinal corrugations 78. Joining portions of the inner sidewalls 72 with the bottom panel 76 are a pair of symmetrical wheel wells 82 which receive the rear tire and wheel assemblies 84. A tailgate 86 is transversely pivoted in the rear opening of the box or bed 66 and suitable backup and tail light assemblies 88 are also mounted in the sidewalls 68 of the bed 66.

Disposed in the interior of the bed 66 and having a length, width and height complementary to the corresponding inside dimensions of the bed 66 is the second alternate embodiment of the invention, a truck bed liner 90. The truck bed liner 90 includes generally vertically disposed sidewalls 92 and a front wall 94. The truck bed liner 90 may include a rail 96 which rests upon the top of the sidewalls 68 of the bed 66. The liner sidewalls 92 and the front wall 94 merge with a bottom panel 98. The sidewalls 92, the front wall 94 and the bottom panel 98 are preferably formed as a unitary liner from a single sheet of extruded HDPE or other thermoplastic engineered material. Wheel wells 100 complementary to the wheel wells 82 of the truck bed 66 are defined by the bed liner 90. Preferably, the bottom panel 98 of the liner 90 includes a plurality of longitudinally oriented corrugations 102 which correspond to the corrugations 78 in the bottom panel 76 of the box In or bed 66.

Referring now to FIG. 5, it will be appreciated that the extruded, formed and corrugated material of the bed liner 90 includes particles 106 of conductive material such as carbon black or other conductive material uniformly dispersed therethrough. As noted above, with regard to the preferred embodiment 10, conductive particles 106 of carbon black constitute approximately 18% to 22% by weight of the thermoplastic material of the bed liner 90. Also as noted above, carbon black, carbon fibers or other conductive particulate material may be utilized in a weight percent range of from about 5% to 25%. Regardless of the materials chosen, as stated above, it is desirable to achieve a surface resistivity of no more than $1\times10^9$ ohms and preferably less or a volume resistivity of no more than $1\times10^9$ ohm-centimeters and preferably less. Thus, it will be appreciated that but for the physical configuration of the second alternate embodiment truck bed liner 90, its purpose and benefit as well as material constituents may be the same.

Referring now to FIGS. 4 and 6, a third alternate embodiment 110 of the invention which is similar to the first alternate embodiment vehicle bed 50 is illustrated. It is, however, a bed liner rather than a truck bed. As such, it includes the sidewalls 92, the front wall 94 and the bottom panel 98. It may include the rail 96. The third alternate embodiment bed liner 110 is a composite or sandwich construction having a first, lower layer 112 of HDPE or similar engineered thermoplastic material and a second or upper layer 114 of HDPE or other material similar to the first layer 112 except that it includes or is doped with dispersed conductive particles 116 such as carbon black or other above described material to the above described weight percents and resistivities.

The composite third alternate embodiment bed liner 110 is preferably co-extruded from a suitable extruding machine (not illustrated) and then formed as necessary to conform to a pickup truck bed such as the metal box or bed 66 illustrated in FIG. 4. It will be appreciated that with the upper conductive layer 114 of the third alternate embodiment truck bed liner 110 exhibits substantially the same electrical charge dissipating characteristics as the other embodiments discussed above, especially the first alternate embodiment vehicle bed 50. However, because it is composed of a sandwich of materials to which conductive particles 116 such as carbon black are added only to the upper or second layer 114, both layers 112 and 114 can be performance optimized. That is, the necessary electrical conductivity is achieved by the upper layer 114 while the lower layer 112 provides optimum strength.

Figure 7:
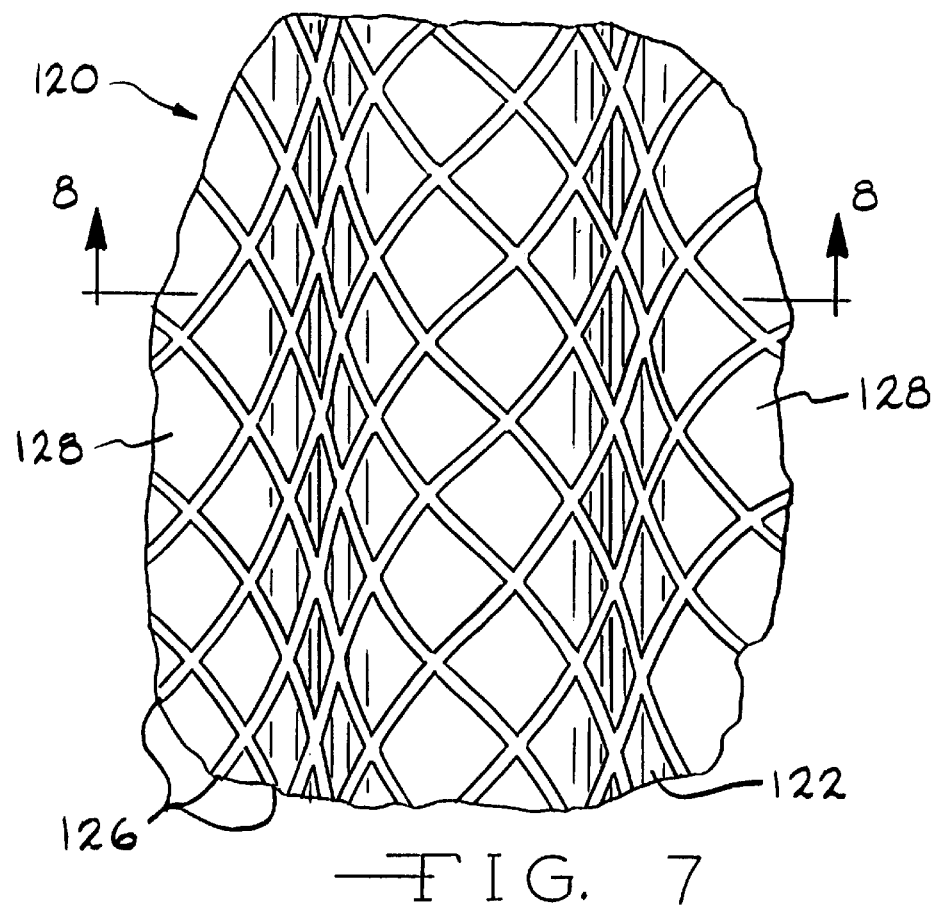
FIG. 7 is an enlarged, fragmentary, top plan view of a fourth alternate embodiment bed or bed liner according to the present invention.
Figure 8:
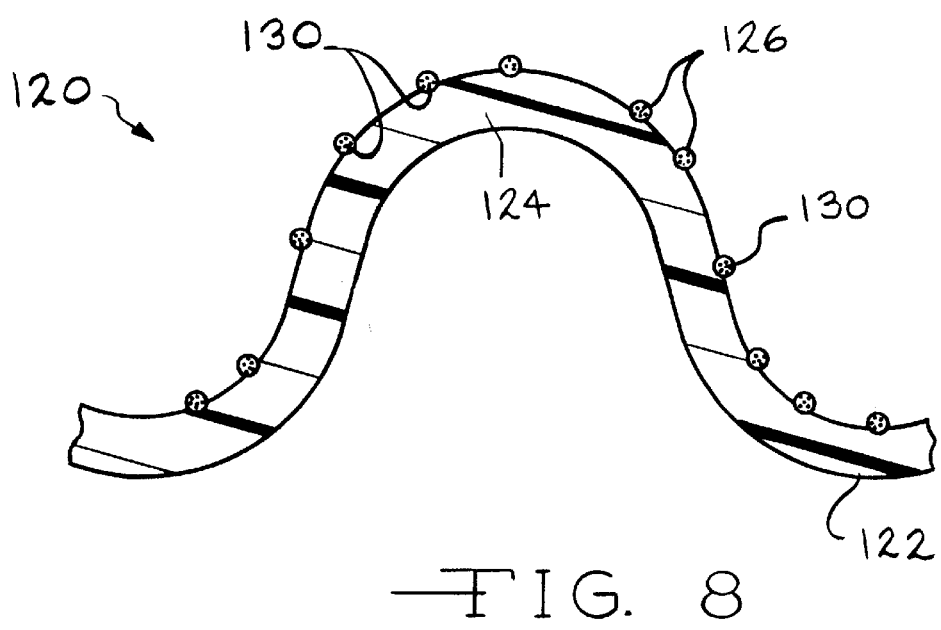
FIG. 8 is a greatly enlarged, fragmentary, sectional view of a fourth alternate embodiment bed or bed liner according to the present invention taken along line 8—8 of FIG. 7.

Referring now to FIGS. 7 and 8, a fourth alternate embodiment bed or bed liner according to the present invention is illustrated and designated by the reference numeral 120. The fourth alternate embodiment bed 120 may be either a bed 10 such as illustrated in FIG. 1 or a bed liner 90 such as illustrated in FIG. 4. As such, the fourth alternate embodiment bed or bed liner 120 includes sidewalls and front wall and includes a bottom panel 122 having corrugations 124 which improve the rigidity and strength of the bottom panel 122 and may also correspond and conform to corrugations 78 in a truck bed bottom panel such as illustrated in FIG. 5. The fourth alternate embodiment bed or bed liner 120 is preferably fabricated of high density polyethylene or other engineered thermoplastic material such as described above. Upon the surface of the bottom panel 122 and preferably autogenously bonded thereto is a mesh fabric 126 which defines generally rectangular or diamond shaped interstices 128. The mesh fabric 126 is preferably a similar composition polyethylene, polyolefin elastomer or other engineered thermoplastic material as described above with regard to the other embodiments or polypropylene. The material of the mesh fabric 126 is doped or mixed with between 5% or 25% by weight of a conductive material 130 such as carbon black or carbon fibers or other materials described above. Conductive material 130 in the range of 18% to 22% has been found preferable.

It will be appreciated that the mesh fabric 126 including the conductive material 130 thus also provides a conductive medium through which electrical charges which may be developed in the bed or bed liner 120 are dissipated into the atmosphere. The mesh fabric 126 has been found particularly efficient in this regard due to the large surface area versus volume ratio of the mesh fabric 126 and thus the large surface area versus conductive material 130 ratio.

Fabrication of the fourth alternate embodiment bed or bed liner 120 and particularly securement of the mesh fabric 126 to the bottom panel 122 is preferably achieved after a flat panel is extruded from an extruding machine (not illustrated) but before it has cooled. At this time, the mesh 126 containing the conductive material 130 is placed upon the surface of the extruded panel after it has been flame treated but before it is vacuum formed into the bed or bed liner 120. Through the vacuum forming operation, the filaments of the mesh fabric 126 will be pressed or pushed into the upper surface of the bottom panel 122 of the bed or bed liner 120 such that they are both intimately bonded and mechanically restrained therein.

Electrostatic charge dissipation tests have been performed on various samples of thermoplastic material beds and bed liners containing conductive material in accordance with MIL Spec. MIL-B81705-B. The conductive material present in all the samples is Cabot Corporation XC-72 carbon black. Samples A and B are corrugated HDPE according to the preferred and the first, second or third alternate embodiments. Sample C is an embossed bed or bed liner and Sample D is a bed or bed liner according to the fourth alternate embodiment. The surface resistivities achieved are the result of many variables, the most significant of which, from the standpoint of the conductive material, is its particle size. Thus, a carbon black finer than Cabot's XC-72 carbon black such as Akzo Nobel's Ketjenblack EC-300 J may be used in amounts reduced by as much as 50% and perhaps more so that good results are achieved with as little as approximately 10% carbon black. Such finer carbon blacks and other conductive materials are, however, typically more expensive and thus it represents simply an alternative rather than a directed choice. The surface resistivities appearing below in Table I are the average values of three separate measurements made on each sample.

TABLE I

| SAMPLE | CARBON BLACK (percent) | SURFACE RESISTIVITY (ohms/sq.) |
| --- | --- | --- |
| A | 19 | $4.17 \times 10^7$ |
| B | 19 | $6.55 \times 10^7$ |
| C | 19 | $6.17 \times 10^8$ |
| D | 19 | $6.67 \times 10^8$ |

It will be appreciated that while the invention has been described as a pickup truck box or bed liner in the various embodiments, the invention is equally suited for and intended for use in other cargo hauling and liner applications such as in minivans, sport utility vehicles and cargo vans. These various applications are all consistent with and envisioned by the inventor inasmuch as the primary purpose and goal of the invention is to provide a bed or liner having electrical charge dissipating characteristics.

The foregoing disclosure is the best mode devised by the inventor for practicing this invention. It is apparent, however, that apparatus incorporating modifications and variations will be obvious to one skilled in the art of cargo beds and bed liners. Inasmuch as the foregoing disclosure presents the best mode contemplated by the inventor for carrying out the invention and is intended to enable any person skilled in the pertinent art to practice this invention, it should not be construed to be limited thereby but should be construed to include such aforementioned obvious variations and be limited only by the spirit and scope of the following claims.

I claim:

1. A bed liner for a pickup truck comprising, in combination,
    a pair of spaced apart sidewalls,
    a front wall extending between said sidewalls, a lip extending outwardly from portions of said sidewalls, and
    a bottom panel extending between said sidewalls and said front panel, said bottom panel including a plurality of longitudinal corrugations,
    said bed liner fabricated of a thermoplastic material and including conductive means in at least a portion of said thermoplastic material for dissipating electrical charges.

2. The bed liner of claim 1 wherein at least a portion of said corrugations conform to corrugations in a bottom of a vehicle bed.

3. The bed liner of claim 1 wherein said conductive means include particles dispersed throughout said thermoplastic material.

4. The bed liner of claim 1 wherein said thermoplastic material comprises two layers and said conductive means is dispersed throughout one of said two layers.

5. The bed liner of claim 1 wherein said conductive means includes a mesh of thermoplastic material having conductive particles dispersed therein.

6. The bed liner of claim 5 wherein said conductive means is carbon black particles.

7. The bed liner of claim 1 wherein said thermoplastic material is high density polyethylene.

8. The bed liner of claim 1 wherein said thermoplastic material and conductive means exhibits a volume resistivity of $1\times10^9$ ohm-centimeters or less.

9. A bed liner for a pickup truck comprising, in combination,
    a pair of spaced apart sidewalls,
    a front wall extending between said sidewalls, and
    a bottom panel extending between said sidewalls and merging with said front panel, a pair of wheel well regions extending between said bottom panel and said sidewalls and adapted to receive corresponding wheel wells of a vehicle,
    said bed liner fabricated of a thermoplastic material and including conductive material in at least a portion of said thermoplastic material for dissipating electrical charges.

10. The bed liner of claim 9 further including corrugations in said bottom panel, at least a portion of said corrugations conforming to corrugations in a bottom of a vehicle bed.

11. The bed liner of claim 9 wherein said conductive material includes particles dispersed throughout said thermoplastic material.

12. The bed liner of claim 9 wherein said thermoplastic material comprises two layers and said conductive material is dispersed throughout one of said two layers.

13. The bed liner of claim 9 wherein said conductive material includes a mesh of thermoplastic material having conductive particles dispersed therein.

14. A bed liner of claim 9 further including a flange extending outwardly from at least a portion of upper edges of said sidewalls.

15. The bed liner of claim 9 wherein said thermoplastic material is high density polyethylene.

16. A bed liner for a pickup truck comprising, in combination,
    a pair of spaced apart sidewalls,
    a front wall extending between said sidewalls, and
    a bottom panel extending between said sidewalls and said front panel, said bottom panel including a plurality of longitudinal corrugations and a pair of wheel well regions extending between said bottom panel and said sidewalls and adapted to receive corresponding wheel wells of a vehicle,
    said bed liner fabricated of a thermoplastic material and including conductive material in at least a portion of said thermoplastic material for dissipating electrical charges.

17. The bed liner of claim 16 wherein said conductive material includes particles dispersed throughout said thermoplastic material.

18. The bed liner of claim 16 wherein said thermoplastic material comprises two layers and said conductive material is dispersed throughout one of said two layers.

19. The bed liner of claim 16 wherein said conductive material includes a mesh of thermoplastic material having conductive particles dispersed therein.

20. The bed liner of claim 16 wherein said thermoplastic material is high density polyethylene.

* * * * *